United States Patent [19]

Hayashi et al.

[11] 4,361,776
[45] Nov. 30, 1982

[54] COIL ASSEMBLY FOR FLAT BRUSHLESS MOTOR

[75] Inventors: Tsuneyuki Hayashi; Masamichi Ishikawa, both of Kanagawa; Hiromitsu Miwa, Tokyo, all of Japan

[73] Assignee: Sony Corporation, Tokyo, Japan

[21] Appl. No.: 166,901

[22] Filed: Jul. 8, 1980

[30] Foreign Application Priority Data

Jul. 11, 1979 [JP] Japan .............................. 54-96013[U]

[51] Int. Cl.³ ............................................. H02K 1/18
[52] U.S. Cl. ................................. 310/268; 310/68 R; 310/156; 310/254; 29/596
[58] Field of Search ............... 310/194, 208, 217, 268, 310/43; 336/198, 208

[56] References Cited

U.S. PATENT DOCUMENTS

| 3,230,490 | 1/1966 | Johnson | 336/198 |
| 3,388,329 | 6/1968 | Rümpelein | 336/208 |
| 3,845,339 | 10/1974 | Merkle et al. | 310/156 |
| 3,912,956 | 10/1975 | Mueller | 310/68 C |
| 4,174,484 | 11/1979 | Schmider | 310/68 R |
| 4,220,879 | 9/1980 | Hoshimi et al. | 310/68 R |

OTHER PUBLICATIONS

Hediger, E. A. Research Disclosure, 19134, Mar. 1980.

Primary Examiner—J. D. Miller
Assistant Examiner—D. L. Rebsch
Attorney, Agent, or Firm—Lewis H. Eslinger; Alvin Sinderbrand

[57] ABSTRACT

A coil assembly for a flat brushless motor comprises a coil of wire, and a bobbin including a flangeless plate-like portion having a peripheral surface on which the coil is wound with the axis of the coil being normal to opposed major surfaces of the plate-like portion, and with at least a part of the peripheral surface having a profile which deviates from a parallel to the coil axis so as to include sections angled in opposite direction from such parallel to the axis for preventing movement of the coil relative to the bobbin in the direction of the coil axis. The mentioned profile of the peripheral surface may be V-shaped and either outwardly concave or convex, or the peripheral surface may have a ridge extending therealong to define such profile. The opposed major surfaces of the plate-like portion are desirably in the form of triangles with two sides thereof radiating from the motor shaft, and with a support portion of the bobbin extending from the third side of the triangular plate-like portion and being offset therefrom for convenient attachment to a fixed mounting plate of the motor.

16 Claims, 17 Drawing Figures

COIL ASSEMBLY FOR FLAT BRUSHLESS MOTOR

BACKGROUND OF THE INVENTION

1. Field of the Invention

This invention relates generally to a coil assembly, and more particularly is directed to a coil assembly for a flat brushless motor.

2. Description of the Prior Art

In existing flat brushless motors, a rotor secured to the motor shaft is comprised of a rotor yoke or magnet casing and an annular permanent magnet, and a stator includes a plurality of coils which are angularly spaced apart about the axis of the shaft and disposed axially between the annular permanent magnet and an additional yoke which may be part of the rotor or stator. When the coils are energized in order, currents flowing therethrough interlink with magnetic flux from the permanent magnet so as to generate torque for rotating the motor shaft. In some conventional flat brushless motors, each of the coils is wound without a core or bobbin and is adhesively secured either to a printed circuit board, in the case where the additional yoke is part of the rotor, or to the additonal yoke in the case where the latter is part of the stator. In the latter case, an insulating material, such as insulating paper, is interposed between each coil and the additional yoke. In either case, the distance required between the permanent magnet and the additional yoke is increased by the thickness of the printed circuit board or of the insulating paper so that the magnetic resistance of the air gap is increased and results in reduced efficiency. Furthermore, it is dfficult to effect the accurate positioning of the coils on the additional yoke, and a special assembling device is needed therefor with the result that manufacturing costs are increased.

In other existing flat brushless motors, each coil is wound between flanges on a bobbin of synthetic resin, and each assembly of a coil and the respective bobbin is mounted on the stator yoke by way of one of the respective flanges. Although the flanged bobbin facilitates the accurate positioning of the respective coil on the stator yoke, the air gap is undesirably increased by the flange thickness. If the flanges are made thin to minimize the increase in the air gap, there is the danger that the flanges may be deformed due to heat generated by the respective coil and the strength of the attachment of the coil assembly to the stator yoke will be decreased.

OBJECTS AND SUMMARY OF THE INVENTION

Accordingly, it is an object of this invention to provide a coil assembly particularly suited for use in a flat brushless motor, and which overcomes the abovedescribed problems encountered in the prior art.

More specifically, it is an object of this invention to provide an improved coil assembly, as aforesaid, and by which a reduced axial distance is required to accommodate the stator coils between the annular permanent magnet and a yoke of a flat brushless motor.

Another object is to provide a coil assembly, as aforesaid, which can be easily and accurately mounted in a flat brushless motor.

A further object is to provide a coil assembly, as aforesaid, which improves the operating efficiency of a flat brushless motor incorporating the same.

In accordance with an aspect of this invention, a coil assembly comprises a coil of wire having an axis about which successive turns of the wire extend; and a bobbin including a flangeless plate-like portion having opposed major surfaces extending to margins of a peripheral surface on which the coil is wound with the coil axis normal to the major surfaces, at least a part of the peripheral surface having a profile which deviates from a parallel to the coil axis and which includes sections angled oppositely from such parallel to the coil axis so as to prevent movement of the coil relative to the bobbin in the direction of the coil axis. The described profile of the peripheral surface may be generally V-shaped and either outwardly concave or convex, or such profile may be defined by a ridge extending along the respective part of the peripheral surface.

Further, it is a feature of this invention to provide the plate-like portion of each bobbin with a generally triangular configuration having two sides radiating from the motor shaft, while the bobbin further includes a support portion extending from the third side of the plate-like portion and being offset from the latter for mounting the respective coil assembly on a mounting plate of the motor. In order to facilitate such mounting of each coil assembly, the support portion of the respective bobbin and the mounting plate have guide elements which are cooperatively engageable and disengageable by relative sliding in directions extending radially from the motor shaft, and the support portion and mounting plate further have cooperatively engageable latching means for securing the coil assembly.

The above, and other objects, features and advantages of the invention, will be apparent from the following detailed description of illustrative embodiments of the invention which is to be read in connection with the accompanying drawings.

DESCRIPTION OF THE PREFERRED EMBODIMENTS

In order to facilitate understanding of the present invention and the various problems solved thereby, reference will first be made to FIG. 1 in which a flat brushless motor 10 according to the prior art is shown to comprise a rotor 11 composed of an annular permanent magnet 12 suitably secured to a magnet holder or rotor yoke 13 which is fixed, at its center, to a boss 14. The rotor 11 is mounted, at its boss 14, on a rotary shaft 15 which is rotatably mounted in a bearing 16 carried by a mounting frame 17. The motor 10 further essentially comprises a stator 18 composed of a stator yoke 19 fixed relative to mounting frame 17 and having a plurality of coils 20 suitably fixed on yoke 19 so as to confront the annular surface of permanent magnet 12 with an air gap $d_1$ between magnet 12 and the adjacent surfaces of coils 20, and a distance $d_2$ between magnet 12 and the confronting surface of stator yoke 19. In the above-described conventional flat brushless motor shown on FIG. 1, the coils 20 are suitably energized in order, and the resulting currents flowing through coils 20 interlink with magnetic flux from permanent magnet 12 so as to generate torque by which rotor 11 and shaft 15 are made to rotate relative to stator 18.

Figure 1:
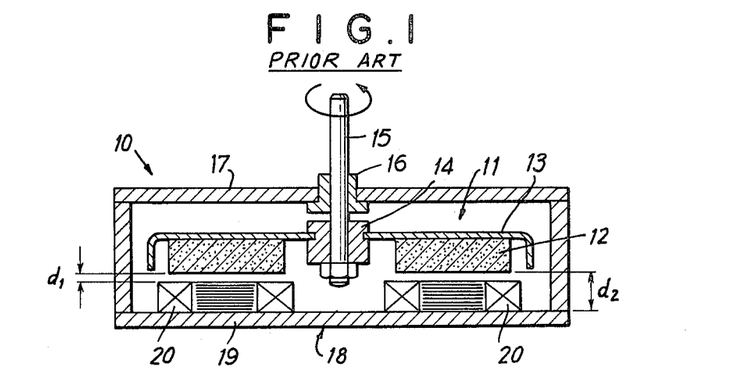
FIG. 1 is a schematic cross-sectional view showing the basic components of one type of flat brushless motor according to the prior art.
Figure 2:
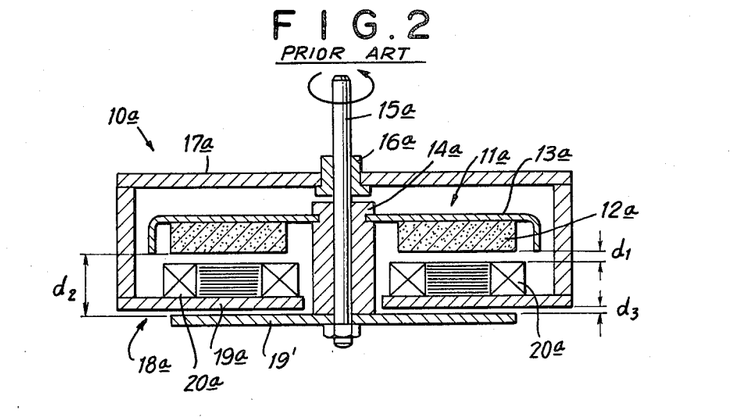
FIG. 2 is a view similar to that of FIG. 1, but showing another type of flat brushless motor according to the prior art.

Referring now to FIG. 2, it will be seen that the various parts of another flat brushless motor 10a according to the prior art which correspond to those described above with reference to FIG. 1 are identified by the same reference numerals, but with the letter "a" appended thereto. It will further be seen that, in the motor 10a, the rotor 11a is further comprised of an additional rotor yoke 19' which is also secured to shaft 15a and spaced axially by the distance $d_2$ from the underside of annular permanent magnet 12a. In motor 10a, the stator coils 20a are fixed on a printed circuit board 19a which is suitably secured to mounting frame 17a so that there is a distance $d_1$ between coils 20a and the undersurface of magnet 12a, and an axial distance $d_3$ between circuit board 19a and additional rotor yoke 19'.

Figure 3:
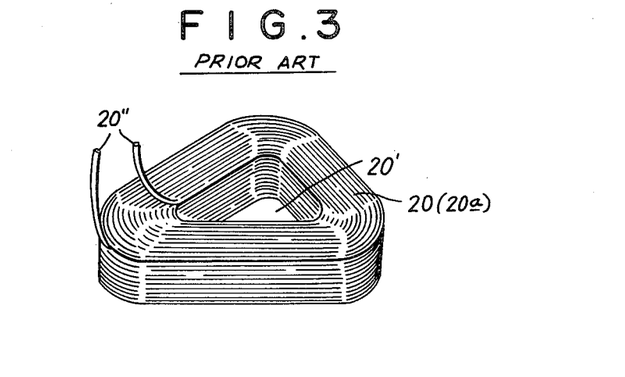
FIG. 3 is an enlarged perspective view showing one of the stator coils that may be used in the motor of FIG. 1 or FIG. 2.

As shown in FIG. 3, each of the coils 20 or 20a used in the motor 10 or 10a is generally of triangular configuration and is wound so as to have a central hole 20' extending therethrough, with end portions 20'' of the wire wound to form the coil being led out therefrom for suitable attachment to a control circuit (not shown). Generally, a plurality of coils 20 or 20a, for example, four, six or eight coils, are used for a motor. When six coils 20 or 20a are used, as shown on FIG. 4, such coils are mounted either on yoke 19 (FIG. 1) or on circuit board 19a (FIG. 2) in the positions shown on FIG. 4. In the case where coils 20 are secured to yoke 19, as by adhesive, it is necessary to provide an insulating material, such as insulating paper, between each coil and the conductive material of the yoke. Therefore, it will be seen that, in motors 10 and 10a of FIGS. 1 and 2, respectively, the distance $d_2$ required between permanent magnet 12 or 12a and yoke 19 or 19', respectively, is increased either by the insulating paper required between each coil and yoke 19 or by the printed circuit board, with the result that the magnetic resistance of air gap $d_2$ is increased to reduce the operating efficiency. Further, in the cases where coils 20 or 20a are wound without cores or bobbins, it is difficult to effect the accurate positioning of the coils on yoke 19 or circuit board 19a, and a special assembling device is needed therefor with the result that manufacturing costs are increased.

Figures 4, 5, 6, 7:
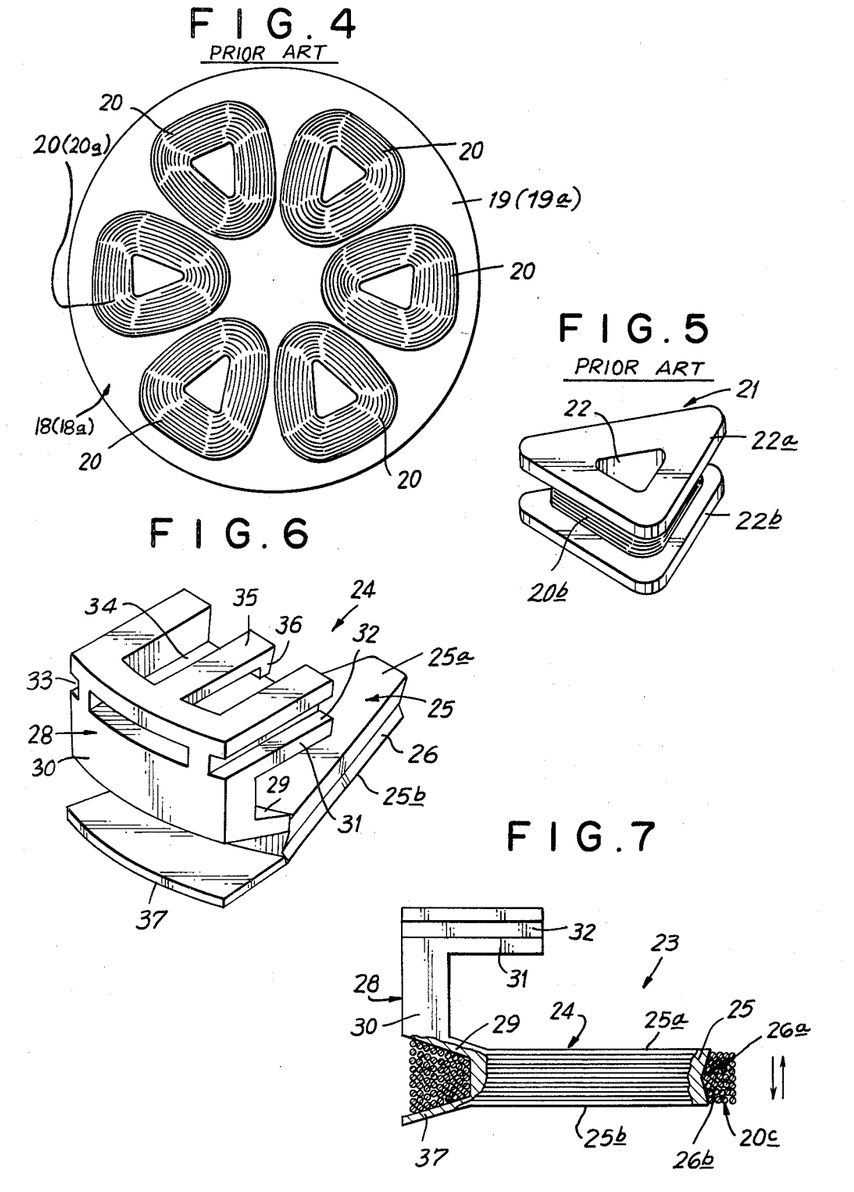
FIG. 4 is a plan view of the stator included in the motor of FIG. 1 or FIG. 2.
FIG. 5 is a perspective view of a conventional coil unit or assembly including a flanged bobbin.
FIG. 6 is an enlarged perspective view of a bobbin on which a coil (not shown) is wound so as to provide a coil assembly according to an embodiment of this invention.
FIG. 7 is a side elevational view of the bobbin of FIG. 6, and which is shown partly broken away and in section and with a coil wound thereon.

In other existing flat brushless motors which are otherwise similar to those illustrated on FIGS. 1 and 2, each coil 20b is wound between flanges 22a and 22b on a bobbin 22 of synthetic resin to form a coil assembly 21 which is mounted on the stator yoke by way of one of the flanges 22a and 22b. Although flanged bobbin 22 facilitates the accurate positioning of the respective coil 20b on the stator yoke, the air gap, as at $d_2$ on FIG. 1 or FIG. 2, needs to be undesirably increased by the flange thickness. If flanges 22a and 22b are made thin to minimize the increase in the air gap, there is the danger that flanges 22a and 22b may be deformed due to heat generated by the respective coil 20b, and the strength of the attachment of the coil assembly 21 to the stator yoke may be decreased.

Referring now to FIG. 7, it will be seen that a coil assembly 23 according to the invention generally comprises a coil 20c of wire and a so-called flangeless bobbin 24 which is molded or otherwise formed of a synthetic resin, such as, PBT (polybutylene terephthalate).

Figure 11:
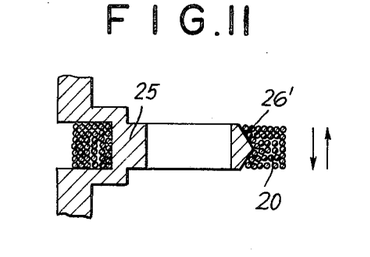
FIGS. 11, 12, 13 and 14 are detailed sectional views illustrating modifications of the profiles of bobbins in coil assemblies according to other embodiments of this invention.
Figure 12:
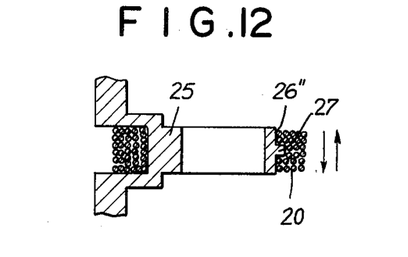

The bobbin 24 of coil assembly 23 is shown to include a plate-like portion 25 having generally triangular major surfaces 25a and 25b extending to margins of a peripheral surface 26 on which the respective coil 20c is wound with the axis of such coil being normal to the major surfaces 25a and 25b. In accordance with this invention, at least a part of the peripheral surface 26, for example, the part of peripheral surface 26 which extends along those two sides of the triangular plate-like portion 25 intended to extend radially in respect to the motor shaft, has a profile which, as shown particularly on FIG. 7, deviates from a parallel to the coil axis and includes sections 26a and 26b angled oppositely from, that is, in opposite directions in respect to the parallel to the coil axis so as to prevent movement of coil 20 relative to bobbin 24 in directions parallel to the coil axis, as indicated by the arrows on FIG. 7. Such profile of the peripheral surface 26 may be V-shaped and outwardly concave, as shown on FIGS. 6 and 7, or V-shaped and outwardly convex, as indicated at 26' on FIG. 11. In a further embodiment of the invention illustrated by FIG. 12, the peripheral surface 26'' of plate-like portion 25 has a ridge 27 extending along its two sides intended to be radially directed so that the upwardly and downwardly directed surfaces of ridge 27 define those sections of the profile which are angled from the parallel in opposite directions to the coil axis for preventing movement of the coil relative to the bobbin in the direction of such axis.

Referring back to FIGS. 6 and 7, it will be seen that bobbin 24 further includes a support portion 28 extending from the margin of peripheral surface 26 which is adjacent major surface 25a of plate-like portion 25 along the side of the latter which is directed radially outward from the motor shaft when coil assembly 23 is mounted in the motor, as hereinafter described. More particularly, support portion 28 is shown to include a vane-like outwardly directed extension 29 of surface 25a which terminates in an upstanding wall 30. An inwardly directed shelf 31 extends from the top of wall 30 above major surface 25a of plate-like portion 25, and guide grooves 32 and 33 extend along opposite sides of shelf 31. A recess 34 is formed in the upper surface of shelf 31 between the grooved side edge portions thereof, and a latching finger 35 extends centrally within recess 34 and terminates in a latching hook or barb 36. The bobbin 24 is completed by a lower extension 37 of the lower major surface 25b which is directed outwardly from the periphery of plate-like portion 25 and which is approximately coextensive with extension 29. As is apparent in FIGS. 7, 8 and 9, when coil 20c is wound on bobbin 24 according to this invention, the described profile of the peripheral surface 26 of plate-like portion 25 is effective to prevent movement of the coil relative to the bobbin at the sides of the triangular plate-like portion 25 which are intended to be directed radially in the completed motor, while the extensions 29 and 37, which are shown to diverge or flare outwardly in the embodiment presently being described, serve to further locate coil 20c therebetween, particularly at the radially outwardly directed side of plate-like portion 25.

Figure 8:
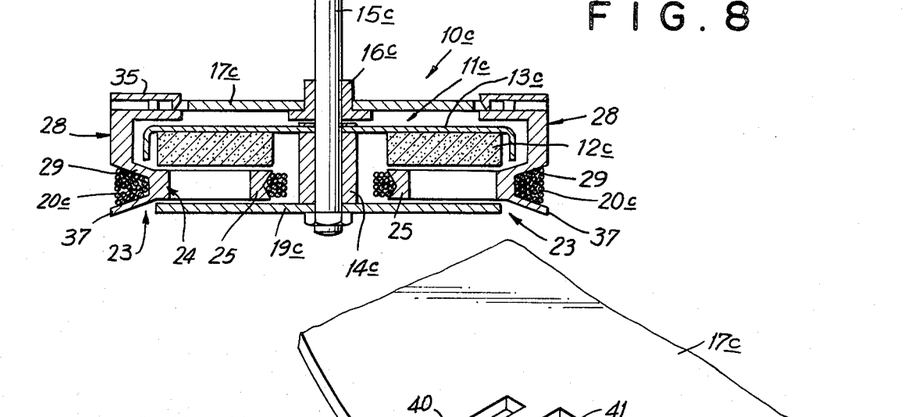
FIG. 8 is a cross-sectional view showing the basic elements of a flat brushless motor incorporating the coil assemblies according to this invention as shown on FIGS. 6 and 7.

Referring now to FIG. 8, it will be seen that a flat brushless motor 10c which embodies a plurality of the described coil assemblies 23 according to this invention may be generally of the type previously described with reference to FIG. 1 and thus comprises a rotor 11c composed of an annular permanent magnet 12c suitably secured to a magnet holder or rotor yoke 13c fixed, at its center, to a boss 14c. The rotor 11c is mounted, at its boss 14c, on a rotary shaft 15c which is, in turn, rotatable in a bearing 16c carried by a mounting frame or plate 17c in the form of a suitably fixed disc. In the motor 10c of FIG. 8, rotor 11c is further shown to include an additional yoke disc 19c secured on shaft 15c and held in suitably axially spaced relation to magnet 12c by means of the boss or spacer 14c.

In motor 10c, the several coil assemblies 23 are mounted on plate or disc 17c so as to constitute the stator, with the coils 20c of the several assemblies 23 being angularly spaced apart similarly to the pattern of the coils 20 on FIG. 4. More particularly, for the purpose of mounting coil assemblies 23 on mounting plate or disc 17c, the peripheral portion of disc 17c is formed with a cutout 38 for each of the coil assemblies 23. Each such cutout 38 is dimensioned so that the opposite side edges 39 and 40 thereof are slidably received in grooves 32 and 33, respectively, of support portion 28 of the respective bobbin 24 when the latter is displaced radially inward as indicated by the arrow on FIG. 9. Further, a keeper hole 41 is formed in mounting plate or disc 17a at a central location adjacent the radially inner portion of each cutout 38 so that, when shelf 31 of support portion 28 is fully engaged in the respective cutout 38 of disc 17c, the latching hook 36 on finger 35 will snap into keeper hole 41 for securing the bobbin 24 in its operative position relative to mounting plate 17c. As is apparent on FIG. 8, in such operative position of each bobbin 24, the respective coil 20c extends between permanent magnet 12c and yoke 19c of rotor 11c with only small axial clearances or spacing being required between each coil and the rotary permanent magnet 12c and yoke 19c. It will be further appreciated from FIG. 8 that, in the operative or mounted positions of coil assemblies 23, the part of each coil 20c extending along the two sides of the respective triangular plate-like portion 25 which diverge from the axis of shaft 15c is effective to interlink with the magnetic flux from permanent magnet 12c. However, the portion of each coil 20c which extends along the outer side of the triangular plate-like portion 25 between extensions 29 and 37 is disposed outside the peripheries of yoke 19c and the annular magnet 12c so as to avoid interlinking with the magnetic flux from the permanent magnet. Thus, the extensions 29 and 37, in embracing the outer part of the respective coil 20c, do not influence the effective size of the air gaps between such coil and magnet 12c and yoke 19c.

It will also be apparent that the flat brushless motor 10c embodying this invention is highly efficient because of the foregoing features, while facilitating the mounting of the coils 20c at accurately predetermined locations.

Figures 9, 10:
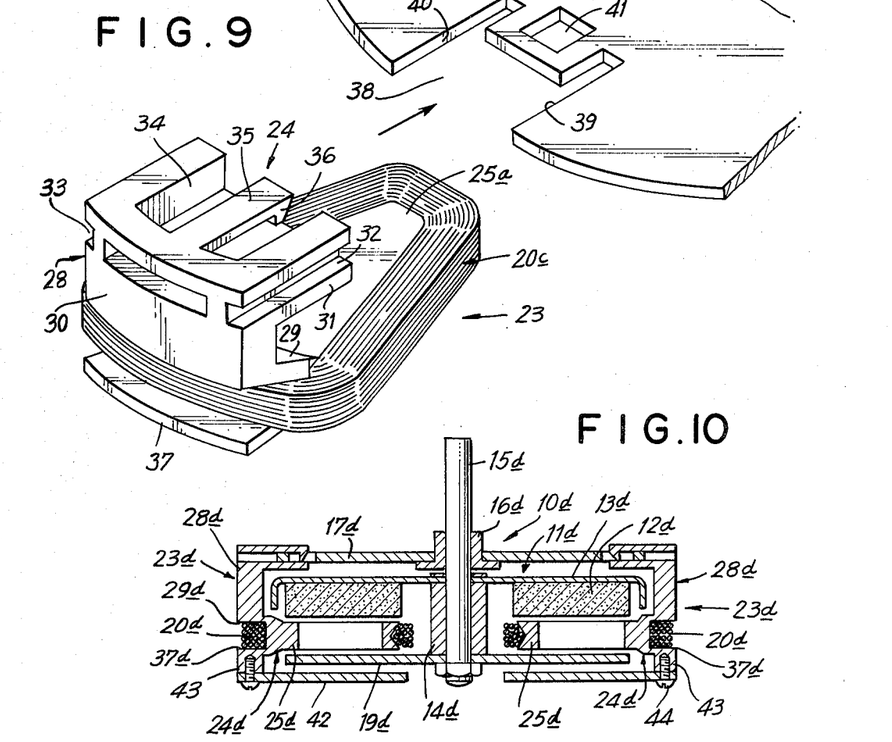
FIG. 9 is a perspective view illustrating the manner in which the coil assembly of FIG. 6 and 7 is secured to a mounting plate of the motor of FIG. 8.
FIG. 10 is a cross-sectional view similar to that of FIG. 8, but showing a flat brushless motor according to another embodiment of this invention.

Referring now to FIG. 10, it will be seen that the invention may be embodied in a motor 10d comprising the above-described components of motor 10c identified by the same reference numerals but with the letter "d" appended thereto, and additionally comprising a printed circuit board 42 which underlies the rotor yoke 19d and is suspended from the bobbins 24d of coil assemblies 23d. More particularly, each of the bobbins 24d is seen to be formed with a downwardly directed lug 43 depending from its lower extension 37d and having a tapped bore receiving a respective screw 44 by which printed circuit board 42 is secured. In the case of coil assemblies 23d having the printed circuit board 42 suspended from bobbins 24d, the extensions 29d and 37d which define the space therebetween for accommodating the outer portion of the respective coil 20d may have substantially parallel surfaces, as on FIG. 10, or such surfaces may diverge outwardly over their entire extent, as indicated at 29e and 37e on FIG. 13, or only at their inner portions, as indicated at 29f and 37f on FIG. 14.

Figures 13, 14, 15:
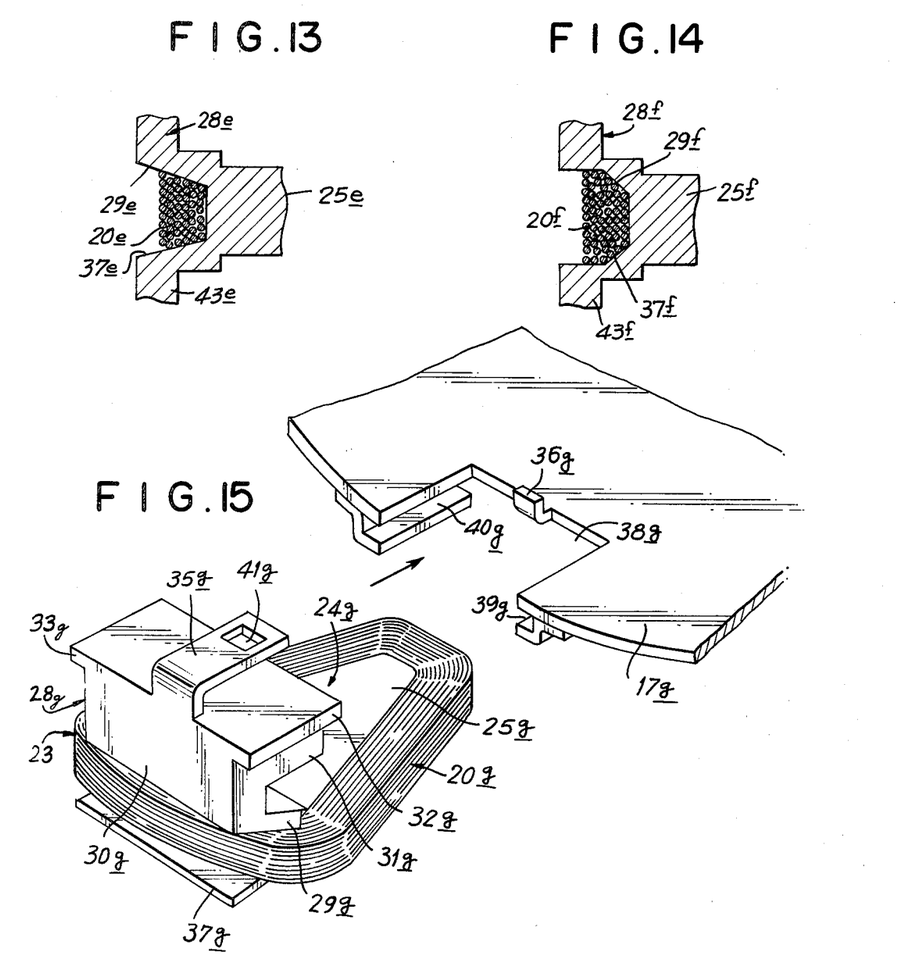
FIG. 15 is a perspective view similar to that of FIG. 9, but showing still another embodiment of this invention.

Referring now to FIG. 15, it will be seen that, in accordance with another embodiment of this invention as there illustrated, the arrangements of the guide elements and latching elements on each bobbin 24g and on the mounting plate 17g may be the reverse of those described with reference to FIG. 9. More particularly, in the embodiment of FIG. 15, in which parts corresponding to those described above with reference to FIG. 9 are identified by the same reference numerals, but with the letter "g" appended thereto, the support portion 28g of each bobbin 24g is shown again to include a shelf 31g directed inwardly from the upper margin of wall 30g so as to overly extension 29g and the adjacent region of plate-like portion 25g. However, in the case of bobbin 24g, the opposite sides of shelf 31g have projecting edge portions 32g and 33g, which are respectively slidably engagable in guide grooves or channels 39g and 40g formed along the opposite side edges of a respective cutout 38g in the periphery of the mounting plate or disc 17g. For securing each bobbin 24g with the edge portions 32g and 33g of its shelf 31g in grooves 39g and 40g in the respective cutout 38g, a latching finger 35g extends resiliently from support portion 28g over shelf 31g and, adjacent its free end, is formed with a keeper hole 41g adapted to receive a latching hook or nose 36g which extends from the inner edge of cutout 38g.

In the motors 10c and 10d illustrated on FIGS. 8 and 10, respectively, the permanent magnet 12c or 12d of the rotor is rotatable in a plane between the plane of the stator coils 20c or 20d on plate-like portions 25 or 25d of the bobbins and the plane of the mounting plate 17c or 17d to which the support portions 28 or 28d are secured. In such arrangements, the rotor yoke 19c or 19d is disposed below stator coils 20c or 20d, that is, at the side of the plane of the stator coils facing away from the plane of mounting plate 17c or 17d.

Figure 16:
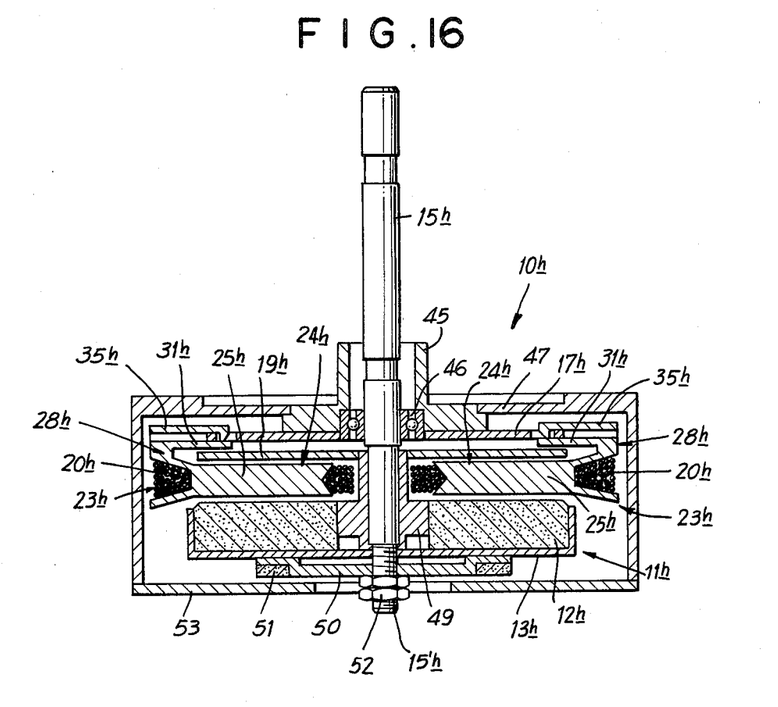
FIG. 16 is a cross-sectional view of a flat brushless motor according to yet another embodiment of this invention.

However, as shown on FIG. 16, in a motor 10h according to still another embodiment of this invention, the rotor yoke 19h may be rotatable in a plane that is interposed between the plane of the stator coils 20h and the plane of the mounting plate or disc 17h from which are supported the bobbins 24h having coils 20h wound thereon to form coil assemblies 23h. Moreover, in motor 10h, the annular permanent magnet 12h and the respective magnet casing 13h are disposed below the plane of stator coils 20h, that is, at the side of the stator coils facing away from mounting plate 17h.

Figure 17:
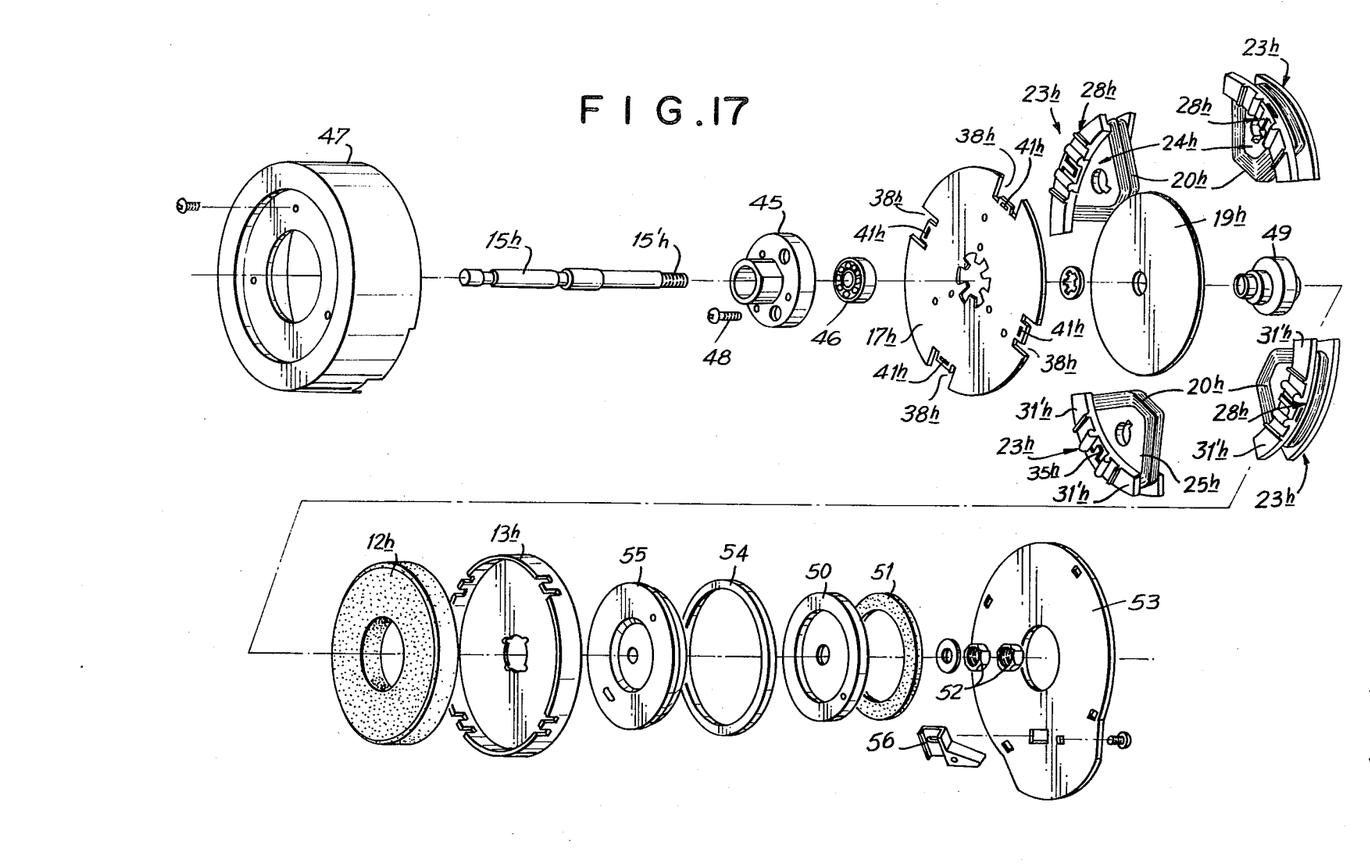
FIG. 17 is an exploded perspective view of the motor of FIG. 16, but showing additional details thereof.

As shown on FIG. 17, which further illustrates some parts of the actual motor 10h omitted from FIG. 16 for the sake of simplicity and because such omitted parts do not relate to the present invention, motor 10h employs four coil units 23h mounted on mounting plate or disc 17h substantially in the manner previously described in detail with reference to FIG. 9. Thus, the bobbin 24h of each coil assembly 23h includes a support portion 28h which is offset from the plane of the respective plate-like portion 25h having coil 20h wound thereon, and which defines guide grooves adapted to slidably receive edges of mounting plate 17h extending along the opposite sides of a respective cutout 38h. Further, each support portion 28h includes a latching finger 35h terminating in a latching hook adapted to engage in a keeper hole 41h provided adjacent the inner end of the respective cutout 38h. The bobbins 24h differ substantially from the bobbin 24 of FIG. 9 in that, by reason of the relatively small thickness of the rotor yoke 19h disposed between plate-like portions 25h of the bobbins and mounting plate or disc 17h, the shelf 31h of support portion 28h need be offset only a relatively small distance from the upper surface of the respective plate-like portion 25h (FIG. 16). Further, as shown on FIG. 17, the shelf 31h of each bobbin 24h may terminate in latterally directed wings 31'h disposed below and directed latterally beyond the grooves provided for receiving the edges of the respective cutout 38h. When all four coil assemblies 23h are mounted on mounting disc 17h, wings 31'h of adjacent coil assemblies abut each other below mounting plate 17h for further stabilizing the positioning of the coil assemblies.

Continuing with the general description of motor 10h, it will be seen that the same includes a bearing housing 45 supporting a bearing 46 in which a motor shaft 15h is mounted, and being secured to a cylindrical shielding case 47. The mounting plate 17h is fixed to the underside of bearing housing 45, as by screws 48 (FIG. 17). A rotor boss 49 is suitably fixed on shaft 15h and is axially disposed between the rotor yoke 19h and the magnet holder or casing 13h which holds the annular permanent magnet extending around boss 49. A circular holder 50 carrying a position-sensing permanent magnet 51 is disposed below magnet casing 13h, and nuts 52 are engaged with a threaded lower end portion 15'h of shaft 15h for securing magnet holder 50 and its magnet 51, magnet casing 13h and magnet 12h, boss 49 and yoke 19h on shaft 15h and constituting a rotor 11h therefrom. A printed circuit board 53 is fixed to the bottom of casing 47, as by screws or the like, and a Hall element (not shown) is mounted on board 53 to cooperate with position-sensing magnet 51 which may be magnetized to provide four angularly spaced apart poles. Although not necessary to an understanding of the present invention, the motor of FIG. 17 is further shown to include a so-called FG ring 54 which is secured on a FG holder 55 under magnet casing 13h and which has its circumferential surface magnetized to provide numerous poles which are alternately north and south. As is known, magnet flux from such FG ring 54 is intended to be detected by a DME (divided magneto resistive element) held by a DME holder 56 which is also mounted on printed circuit board 53.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention as defined in the appended claims.

What is claimed is:

1. A coil assembly comprising: a coil of wire having an axis about which successive turns of the wire extend; and a bobbin including a flangeless plate-like portion having opposed major surfaces extending to margins of a peripheral surface on which said coil is wound with said axis normal to said major surfaces, at least a part of said peripheral surface having a profile which deviates from a parallel to said axis and which includes sections angled in opposite directions in respect to said parallel to the axis so as to prevent movement of said coil relative to said bobbin in the direction of said axis, said profile being generally V-shaped and outwardly convex.

2. A coil assembly comprising: a coil of wire having an axis about which successive turns of the wire extend; and a bobbin including a flangeless plate-like portion having opposed major surfaces extending to margins of a peripheral surface on which said coil is wound with said axis normal to said major surfaces, at least a part of said peripheral surface having a profile which deviates from a parallel to said axis and which includes sections angled in opposite directions in respect to said parallel to the axis so as to prevent movement of said coil relative to said bobbin in the direction of said axis, said part of the peripheral surface having a ridge extending therealong to define said profile.

3. A coil assembly comprising: a coil of wire having an axis about which successive turns of the wire extend; and a bobbin including a flangeless plate-like portion having opposed major surfaces extending to margins of a peripheral surface on which said coil is wound with said axis normal to said major surfaces, at least a part of said peripheral surface having a profile which deviates from a parallel to said axis and which includes sections angled in opposite directions in respect to said parallel to the axis so as to prevent movement of said coil relative to said bobbin in the direction of said axis, said bobbin further including a support portion extending from one of said margins of the peripheral surface and being offset from the respective one of said major surfaces of the plate-like portions for mounting of the coil assembly.

4. A coil assembly according to claim 3; in which said major surfaces of the plate-like portion generally have the configurations of triangles, said part of the peripheral surface having said profile extends along two sides of said triangles, and said support portion extends from the third side of said triangles.

5. A coil assembly according to claim 4; in which said support portion has guide elements at opposite sides thereof, and a latching element between said guide elements.

6. A flat brushless motor comprising mounting means; a shaft rotatably mounted in said mounting means; a rotor secured on said shaft and including an annular permanent magnet and a rotor yoke spaced from said magnet in the direction of the axis of said shaft; and a stator including a plurality of coil assemblies spaced angularly from each other around said shaft, each of said coil assemblies including a coil of wire having an axis parallel to the shaft axis and about which successive turns of the wire extend, a bobbin including a flangeless plate-like portion projecting between said magnet and rotor yoke and having opposed major surfaces extending to margins of a peripheral surface on which the respective coil is wound with the coil axis being normal to said major surfaces, at least a part of said peripheral surface having a profile which deviates from a parallel to said coil axis and which includes sections angled in opposite directions in respect to said parallel to the coil axis so as to prevent movement of said coil relative to the respective bobbin in the direction of said coil axis, and a support portion extending from said plate-like portion at a region of the latter directed radially away from said shaft and being secured to said mounting means for supporting the respective coil assembly.

7. A flat brushless motor according to claim 6; in which said profile is generally V-shaped.

8. A flat brushless motor according to claim 7; in which said V-shaped profile is outwardly concave.

9. A flat brushless motor according to claim 7; in which said V-shaped profile is outwardly convex.

10. A flat brushless motor according to claim 6; in which at least said part of the peripheral surface has a ridge extending therealong to define said profile.

11. A flat brushless motor according to claim 6; in which said major surfaces of the plate-like portion of each bobbin have configurations substantially of triangles, and said part of the peripheral surface having said profile extends along two sides of said triangles radiating substantially from said shaft.

12. A flat brushless motor according to claim 11; in which said support portion of each said bobbin extends from one of said margins of the respective peripheral surface at the third side of the triangle and is offset from the respective one of the major surfaces, said support portion of each bobbin and said mounting means have guide elements which are cooperatively engageable and disengageable by relative sliding in directions extending radially from said shaft, and said support portion of each bobbin and said mounting means have cooperatively engageable latching means for securing said coil assemblies.

13. A flat brushless motor according to claim 12; in which said mounting means includes a fixed disc having spaced apart peripheral cutouts for said coil assemblies, respectively, said support portion of each bobbin is received in the respective cutout of said disc, said guide elements are provided along opposite sides of each said support portion and the respective cutout, and said latching means are provided at the center of each support portion and the respective cutout.

14. A flat brushless motor according to claim 13; in which said guide elements include grooves extending along said opposite sides of the respective support portion and opposite side edges of said respective cutout slideable along said grooves; and in which said latching means include a latching hook extending from said support portion and a keeper hole in said disc adjacent to the respective cutout to receive said hook.

15. A flat brushless motor according to claim 13; in which said guide elements include means defining grooves extending along said opposite sides of each said cutout and slideably receiving opposite side edges of said respective support portion; and in which said latching means includes a latching hook extending from said disc at each of said cutouts, and a keeper hole in each said support portion to receive the respective hook.

16. A flat brushless motor according to claim 11; in which said third sides of the triangles generally coincide with outer peripheries of said rotor yoke and permanent magnet so that the parts of the coils extending along said two sides of the triangles interlink with the magnetic flux from said permanent magnet and the parts of the coils extending along said third sides do not so interlink.

* * * * *